(12) United States Patent
Nigmatulin

(10) Patent No.: US 7,338,253 B2
(45) Date of Patent: Mar. 4, 2008

(54) RESILIENT SEAL ON TRAILING EDGE OF TURBINE INNER SHROUD AND METHOD FOR SHROUD POST IMPINGEMENT CAVITY SEALING

(75) Inventor: Tagir Robert Nigmatulin, Greenville, SC (US)

(73) Assignee: General Electric Company, Schenectady, NY (US)

( * ) Notice: Subject to any disclaimer, the term of this patent is extended or adjusted under 35 U.S.C. 154(b) by 284 days.

(21) Appl. No.: 11/226,393

(22) Filed: Sep. 15, 2005

(65) Prior Publication Data
US 2007/0237624 A1 Oct. 11, 2007

(51) Int. Cl.
*F01D 11/00* (2006.01)
(52) U.S. Cl. .................... 415/139; 415/174.2
(58) Field of Classification Search ............. 415/135, 415/139, 173.3, 174.2
See application file for complete search history.

(56) References Cited

U.S. PATENT DOCUMENTS

| | | | |
|---|---|---|---|
| 5,988,975 A * | 11/1999 | Pizzi | ............... 415/139 |
| 6,126,389 A | 10/2000 | Burdgick | |
| 6,390,769 B1 | 5/2002 | Burdgick | |
| 6,402,466 B1 | 6/2002 | Burdgick | |
| 6,435,823 B1 | 8/2002 | Schroder | |
| 6,554,566 B1 | 4/2003 | Nigmatulin | |
| 6,648,333 B2 * | 11/2003 | Aksit et al. | ............... 415/174.2 |
| 6,726,448 B2 | 4/2004 | McGrath | |
| 6,814,538 B2 | 11/2004 | Thompson | |
| 6,884,026 B2 | 4/2005 | Glynn | |
| 6,918,743 B2 * | 7/2005 | Gekht et al. | ............... 415/139 |
| 7,217,089 B2 * | 5/2007 | Durocher et al. | ......... 415/174.2 |
| 2003/0133790 A1 * | 7/2003 | Darkins et al. | ............. 415/139 |
| 2005/0152777 A1 * | 7/2005 | Thompson | ............... 415/173.3 |

* cited by examiner

*Primary Examiner*—Richard A. Edgar
(74) *Attorney, Agent, or Firm*—Nixon & Vanderhye PC

(57) ABSTRACT

A sealing arrangement for the post impingement cavity of a stator shroud segment is provided that includes a resilient seal to reduce air leakage and improve turbine energy efficiency. The stator shroud segment includes an outer shroud having a leading edge groove and a trailing edge groove; and a plurality of inner shrouds, each having a leading edge hook and a trailing edge hook. The leading and trailing hooks of each of the inner shrouds are respectively engaged with the leading and trailing edge grooves of the outer shroud so as to connect the inner shroud to the outer shroud. The resilient shaped seal is located at a trailing edge of the respectively engaged inner and outer shrouds at an interface of the inner shroud and the outer shroud. In an example embodiment, a sealing groove is defined in the outer shroud for receiving the aft resilient seal.

17 Claims, 4 Drawing Sheets

RESILIENT SEAL ON TRAILING EDGE OF TURBINE INNER SHROUD AND METHOD FOR SHROUD POST IMPINGEMENT CAVITY SEALING

BACKGROUND OF THE INVENTION

The present invention relates to gas turbines, and, in particular, to a resilient seal for reducing air leakage and improving turbine engine efficiency.

In industrial gas turbines, shroud segments are fixed to turbine shell hooks in an annular array about the turbine rotor axis to form an annular shroud radially outwardly of and adjacent to the tips of buckets forming part of the turbine rotor. The inner wall of the shroud defines part of the gas path. Conventionally, the shroud segments are comprised of inner and outer shrouds provided with complimentary hooks and grooves adjacent to their leading (forward) and trailing (aft) edges for joining the inner and outer shrouds to one another. The outer shroud is, in turn, secured to the turbine shell or casing. Typically, each shroud segment has one outer shroud and two or three inner shrouds.

A few designs have been used for configuring inner shrouds. One conventional configuration is illustrated in FIG. 1 and referred to as the opposite hook design. As can be seen, in the traditional opposite hook design, the inner shroud 10 includes leading and trailing edge hooks 12,14 projecting in opposite directions. The outer shroud 16 retains the inner shroud with leading and trailing mutually facing hooks 18,20.

This conventional shroud hook arrangement can limit the surface 22 available for impingement cooling and requires additional, less efficient convectional cooling of the inner shroud. In addition, the axial load surface between the inner and outer shrouds is always one sided; the axial load surface is either at the forward side or at the aft side. While the loaded surface provides a sealing function for the post impingement cavity 24 of the shroud assembly, the other end of the shroud assembly is unsealed.

By making the inner shroud 110 C-shaped with the hooks facing one another, as for example in U.S. Pat. No. 6,402, 466, the disclosure of which is incorporated herein by reference, and as schematically shown in FIG. 2, the impingement cooling can cover the entire inner side 122 of the inner shroud. However, post impingement cavity 124 leakage undesirably reduced the cooling efficiency, increases the usage of cooling air, and deteriorates performance.

BRIEF DESCRIPTION OF THE INVENTION

In an example embodiment of the invention, the inner shroud is C-shaped with hooks turned towards one another, so that impingement cooling covers substantially the entire inner shroud extent. In addition, with the load surface at the forward hook, a resilient seal is provided between the inner and outer shrouds at the aft side to seal the post impingement cavity from both sides. The proposed shroud hook configuration provides cooling of the inner shroud while the load and seal arrangement reduces the usage of cooling air and improves performance.

Thus, the invention may be embodied in a sealing arrangement for a stator shroud of a multi-stage gas turbine comprising: at least one shroud segment having a leading edge and a trailing edge with respect to a hot gas path through the turbine, each shroud segment comprising an outer shroud and at least one inner shroud connected thereto; said outer shroud having first and second grooves defined adjacent to and along said leading and trailing edges; said at least one inner shroud having a leading edge axially projecting hook portion and a trailing edge axially projecting hook portion for respectively engaging said first and second grooves of said outer shroud, said engagement connecting said inner shroud to said outer shroud; and a resilient seal located between said trailing edge axially projecting hook portion of said at least one inner shroud and said outer shroud.

The invention may also be embodied in a sealing arrangement for a stator shroud segment comprising: an outer shroud having a leading edge and a trailing edge, said outer shroud comprising a leading edge hook and a trailing edge hook, both said hooks of said outer shroud projecting in opposite axial directions; a plurality of inner shrouds each having a leading edge and a trailing edge, each of said inner shrouds comprising a leading edge hook and a trailing edge hook, both said hooks of said inner shroud projecting towards one another; said leading and trailing hooks of each said inner shroud being respectively engaged with said leading and trailing hooks of said outer shroud, said engagement connecting said inner shroud to said outer shroud; and a resilient seal located between the respective trailing edge hook of each said inner shroud and said outer shroud.

The invention may further be embodied in a method for sealing a post impingement cavity in a stator shroud of a multi-stage gas turbine comprising at least one stator shroud segment having a leading edge and a trailing edge with respect to hot gas flow through said gas turbine, each shroud segment including an outer shroud and at least one inner shroud connected thereto; said outer shroud having first and second grooves defined adjacent to and along said leading and trailing edges; said at least one inner shroud having a leading edge axially projecting tab portion and a trailing edge axially projecting tab portion for respectively engaging said first and second grooves of said outer shroud, said engagement connecting said inner shroud to said outer shroud, said method comprising: providing a resilient seal between said trailing edge axially projecting hook portion of said at least one inner shroud and said outer shroud, thereby to seal a trailing edge of a post impingement cavity defined in part by a radially outer surface of said inner shroud.

BRIEF DESCRIPTION OF THE DRAWINGS

These and other objects and advantages of this invention, will be more completely understood and appreciated by careful study of the following more detailed description of the presently preferred exemplary embodiments of the invention taken in conjunction with the accompanying drawings, in which.

DETAILED DESCRIPTION OF THE INVENTION

As mentioned above, a turbine stator has shrouds which prevent the turbine shell from being exposed to the hot gas path. The shrouds, especially in the first and second stages are exposed to very high temperatures of the hot gas in the hot gas path and have heat transfer coefficients which are also very high due to the rotation of the turbine blades. In the early stages of a gas turbine, the shrouds can be comprised of two major components, the inner shroud and the outer shroud. Inner shrouds are made from high temperature resistant material and are exposed to the hot gas path. The inner shrouds may also have thermal boundary coatings. The outer shrouds are made from lower temperature resistant and lower cost materials compared to the inner shrouds. To cool the inner and outer shrouds, cold air from the compressor is used.

To cool inner shrouds, different cooling and sealing methods are used. The most common method is impingement cooling to cool the radially outer side of the inner shroud. Increasing the coverage of impingement cooled surface area and reducing the distance between the impingement plate and the surface being impingement cooled, and also sealing the impingement cavity is a challenge. The goal is cool the inner shroud with less air and distribute post impingement air while reducing leakage, to increase the efficiency of the turbine.

Figure 1:
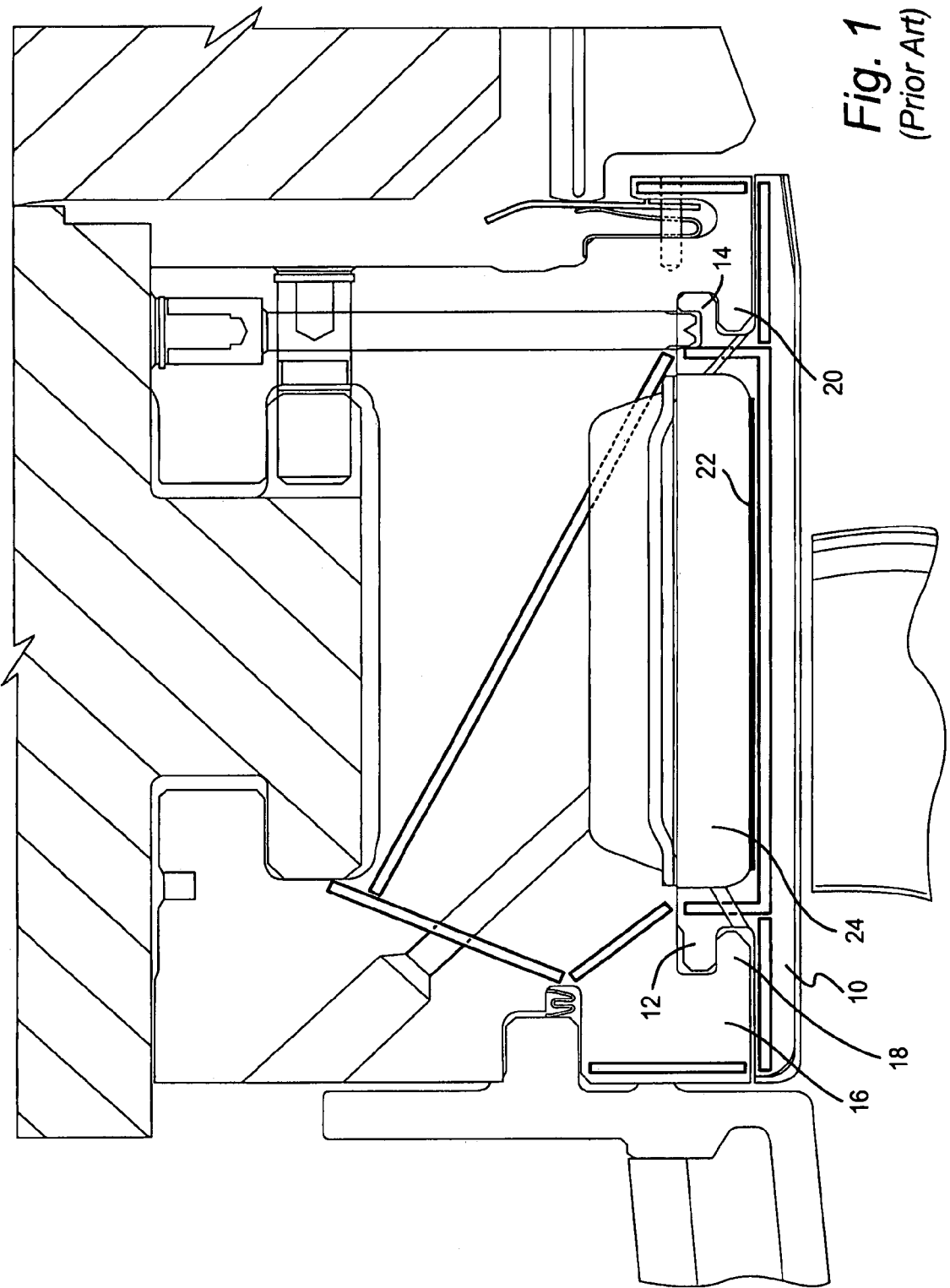
FIG. 1 is a schematic illustration, partly in section, of a conventional stage 2 shroud.

As mentioned above, FIG. 1 schematically illustrates a conventional opposite hook design for an inner shroud. As shown in and described with reference to FIG. 1, the inner shroud 10 includes an inner shroud leading edge hook 12 and an inner shroud trailing edge hook 14 for engagement with corresponding leading and trailing edge hooks 18,20 of an outer shroud 16.

Figure 2:
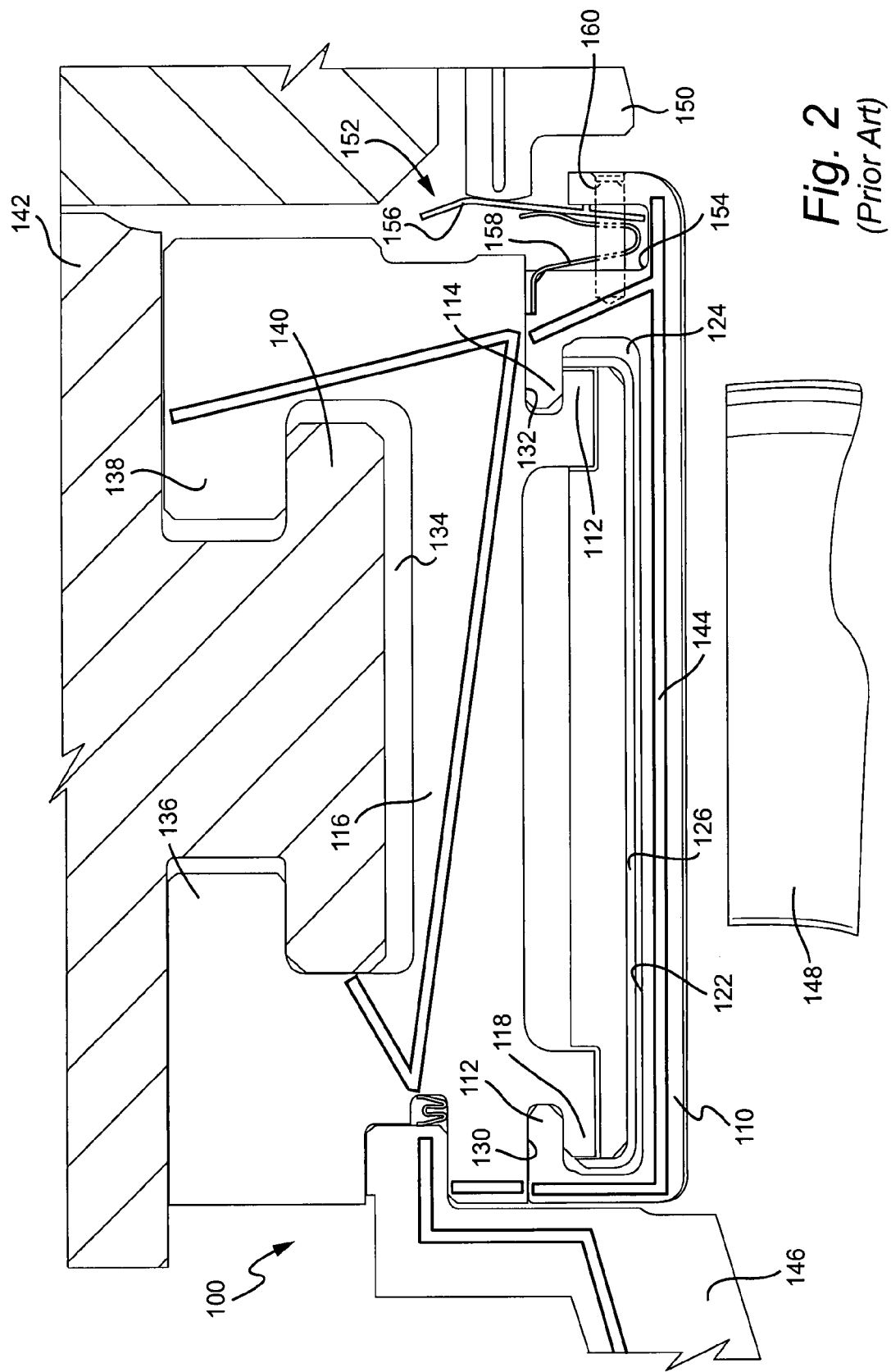
FIG. 2 is an illustration of another conventional stage 2 shroud.

Referring to FIG. 2, which was also briefly described above, there is illustrated a shroud segment, generally designated 100 comprised of an outer shroud 116 and a plurality of inner shrouds 110. Although the illustrated shroud segment would typically include two or three inner shrouds, only one inner shroud is shown in FIG. 2 for purposes of clarity. The inner shrouds have hooks 112 and 114 adjacent to their leading and trailing edges, respectively, for circumferentially and axially slidable engagement in final assembly, with grooves 130 and 132 defined by hooks 118 and 120 of the outer shroud. An impingement cooling plate 126 is mounted between the shrouds 110,116 to provide for impingement cooling of the inner wall surfaces 122 of the inner shroud 110 segment.

The outer shroud 116 has a dovetail groove 134 defined by leading and trailing hooks 136,138 for engaging an outer dovetail 140 forming part of the fixed turbine shell or casing 142 for securing the shroud segment 100 to the casing 142. It will be appreciated that an annular array of shroud segments are formed about the rotor of the gas turbine and about the tips of the buckets on the rotor, thereby defining an outer wall or boundary for the hot gas flowing through the hot gas path of the turbine. In FIG. 2, the inner shroud seal slots 144, the stage 2 nozzle structure 146, stage 2 bucket 148 and stage 3 nozzle structure 150 are shown for completeness and reference.

The hooks 112,114 of the inner shroud 110 are engaged with the leading and trailing edge hooks 118,120 and, in particular, with the grooves 130,132 of the outer shroud. Although not illustrated, a receptacle or hole is defined in the leading edge hook of the inner shroud for receiving the inner shroud rotation pin inserted through a corresponding bore defined in the outer shroud leading edge portion.

A leaf seal assembly, generally designated 152 is secured in a seat 154, e.g., a groove, formed along the trailing edge of the inner shroud(s) 110, as disclosed for example in U.S. Pat. No. 6,402,466. The leaf assembly 152 includes a flat plate 156 and a pair of spring clip(s) 158 (only one of which is shown). The spring clips and the plate have aligned openings for receiving pins 160 adjacent opposite ends of the groove for securing the seal assembly 152 in the groove 166 of the inner shroud.

Figure 3:
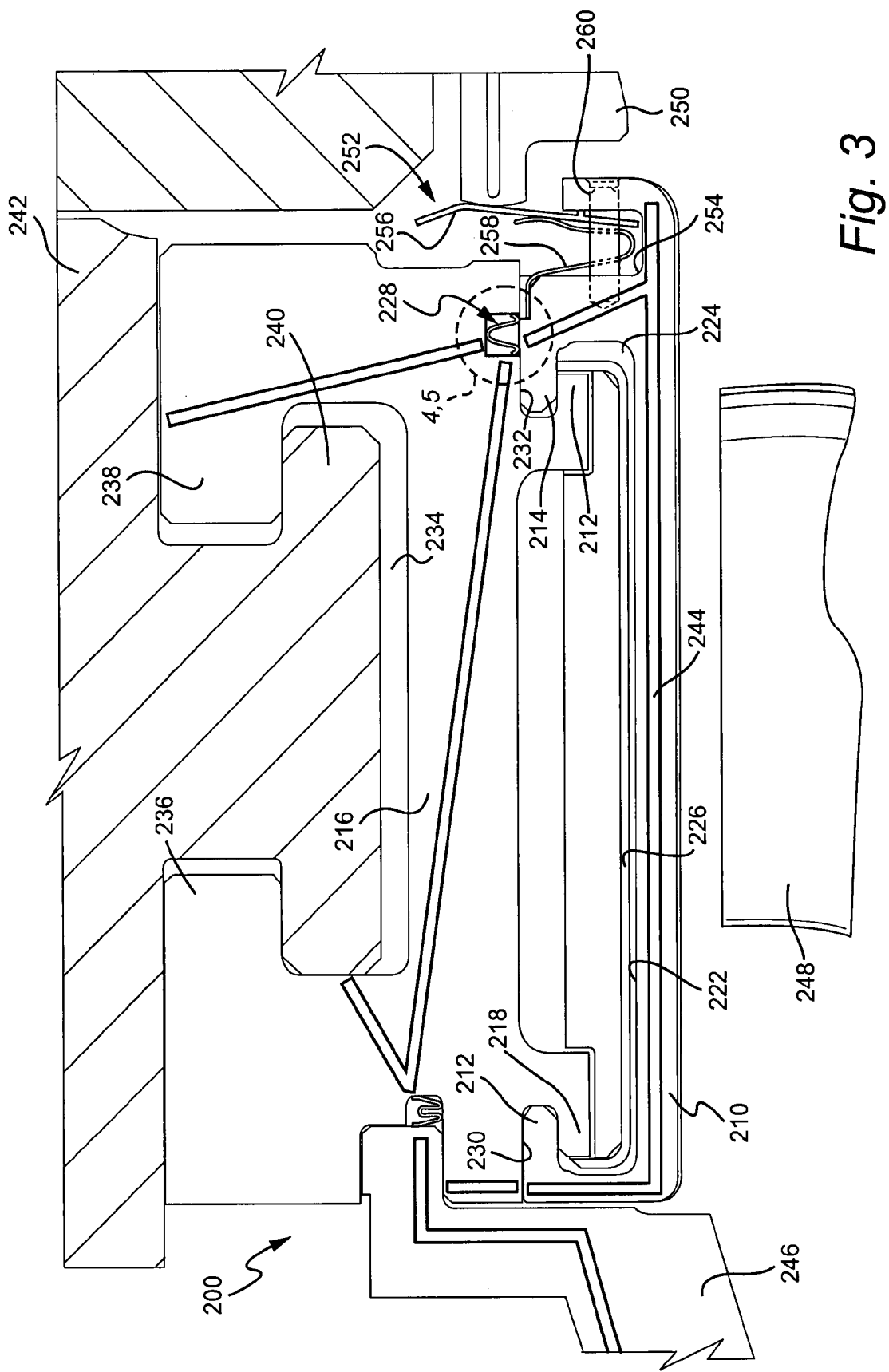
FIG. 3 is a schematic illustration, partly in section of a stage 2 shroud embodying the invention.
Figure 4:
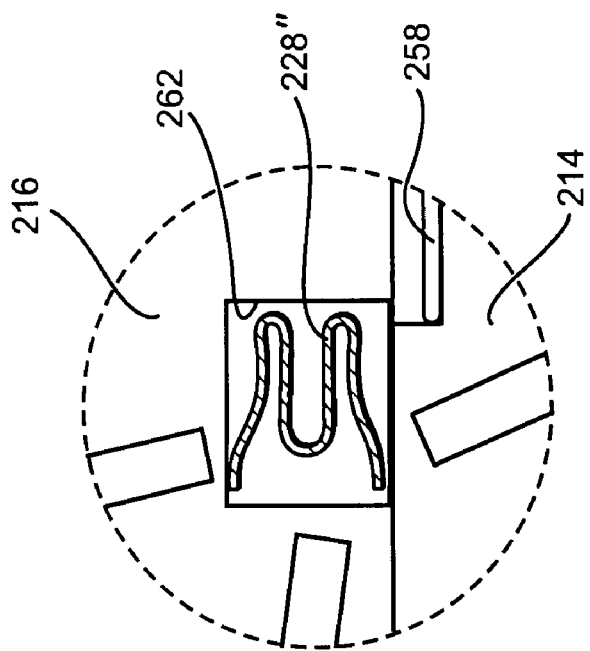
FIG. 4 is a schematic view of the aft seal in an example embodiment of the invention.
Figure 5:
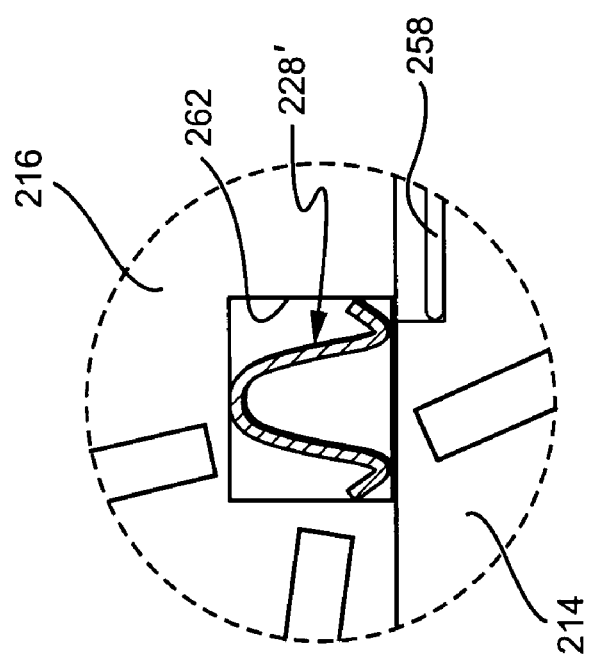
FIG. 5 is a view similar to FIG. 4 showing an alternate seal in an alternate example embodiment of the invention.

Example embodiments of the invention will now be described with reference to FIGS. 3-5. Reference numerals similar to those used in FIG. 2, but increased by 100, are used in FIGS. 3-5 to identify parts that are similar to or the same as those illustrated and described with reference to FIG. 2. The description of those parts will not be repeated except where necessary or desirable to explain the structural and functional features of the respective example embodiments.

In an example embodiment, the shroud assembly is comprised a C-shaped inner shroud 210, with the hooks turned to each other so that impingement cooling can cover the entire side 222 of the inner shroud and so that the distance from the impingement plate 226 to the side 222 being cooled can be controlled. Also, by making the load surface of the shroud assembly the forward hook 212 and providing a resilient seal 228 between the inner and outer shrouds 210,216 at the aft side, the post impingement cavity 224 is sealed from both ends.

More specifically, in an example embodiment of the present invention, air leaking out through the chordal gap between the outer shroud 216 and the inner shroud 210 is substantially reduced by the addition of a resilient seal 228 positioned between the outer shroud 216 trailing edge hook 214 of the inner shrouds.

In the illustrated embodiment, the resilient springy seal 228 is disposed in a seal groove 262 defined in the outer shroud 216 to open in a radially inner direction, in opposed facing relation to the trailing or aft hook 124 of the inner shroud 210. The resilient seal 228 is defined in the outer shroud 216 to facilitate the accommodation of the spring clip 258 and the like. It is to be understood, however, that a seal groove 262 could be suitably defined in the aft inner shroud hook 214.

Preferably the resilient seal 228 is shaped as a wave seal, similar to the Greek letter Ω (as shown at 228, 228' in FIGS. 3 and 4), like a "W" (as shown at 228" in FIG. 5), like an "E", like a "V", like the bends of an accordion, or any other shape that allows the seal to be spring-like or otherwise resiliently compressible and provide the requisite sealing function. Seals of this type are made by a number of companies, including the Fluid Sciences business unit of PerkinElmer, Inc. and Advanced Products Company. The use of a resilient seal as disclosed above significantly reduces the amount of air flow that can leak from the between the trailing edge hook 214 and the trailing edge groove 232 of the shrouds, respectively, into the hot gas path of the turbine. Thus, the use of a resilient seal causes most of what would be air leakage past the seal to be properly routed from the post-impingement cavity 224 below the impingement plate 226 and reduces leakage out of that cavity. Thus, the resilient seal 228 of the invention effectively limits the leakage flow path by reducing the amount of air leakage, so that more air will pass through the turbine and be available for use for work and cooling, rather than being just wasted energy. This results in a higher operating efficiency for the turbine.

It should be noted that the seal 228 can be made of a single piece of material or a plurality of pieces of material with all of the inner shrouds positioned in the annular array of shroud segments about the turbine rotor axis. In an example embodiment, the seal is made from two pieces of material that each extend half way around the array of shroud segments.

The material from which the seal is made is preferably a metal alloy that can withstand the temperatures that are seen in the vicinity of the seal. When such temperatures range between 1200 and 1300 degree F., this metal alloy is, for example, a product named Waspaloy, a nickel-based alloy. For lower temperatures, the seal is preferably made from Inconel 718 which is another nickel-based alloy. Although it is made from metal based material, the seal is resilient, because it is made in a springy or compressible shape, and it is made using a relatively thin material.

In the illustrated example embodiment, the outer shroud 216 has a radially outer dovetail groove 234 for receiving a hook 240 formed as a part of the fixed turbine shell 242 for securing the shroud segment 200 to the shell, as in the FIG. 2 assembly. It is to be appreciated, however, that the invention is not limited to particulars of the outer shroud attachment.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A sealing arrangement for a stator shroud of a multi-stage gas turbine comprising:
at least one shroud segment having a leading edge and a trailing edge with respect to a hot gas path through the turbine, each shroud segment comprising an outer shroud and at least one inner shroud connected thereto; said outer shroud having first and second grooves defined adjacent to and along said leading and trailing edges; said at least one inner shroud having a leading edge axially projecting hook portion and a trailing edge axially projecting hook portion for respectively engaging said first and second grooves of said outer shroud, said engagement connecting said inner shroud to said outer shroud;
an impingement plate defining a post impingement cavity in said at least one inner shroud; and
a resilient seal located between said trailing edge axially projecting hook portion of said at least one inner shroud and said outer shroud, wherein a seal groove is defined in one of said inner and outer shrouds and opens radially to face the other of the inner and outer shrouds adjacent the trailing edge, said resilient seal being disposed in said seal groove, thereby to seal a trailing edge of said post impingement cavity defined in part by a radially outer surface of said inner shroud.

2. A sealing arrangement for a stator shroud as in claim 1, wherein said resilient seal is generally W-shaped.

3. A sealing arrangement for a stator shroud as in claim 1, wherein said resilient seal is wave seal, shaped generally as a Greek letter omega.

4. A sealing arrangement for a stator shroud as in claim 1, comprising a plurality of said inner shrouds connected to said outer shroud, each of said inner shrouds including said resilient seal, disposed at an interface of the respective trailing edge axially projecting hook portion and said outer shroud.

5. A sealing arrangement for a stator shroud as in claim 1, wherein said resilient seal is made from a thin nickel-based alloy material.

6. A sealing arrangement for a stator shroud as in claim 1, wherein said resilient seal is made from a nickel-based alloy designed to withstand temperatures in the range of 1200 to 1300° F.

7. A sealing arrangement for a stator shroud as in claim 1, wherein said resilient seal is formed from a single piece of material.

8. A sealing arrangement for a stator shroud as in claim 1, wherein the seal groove is defined in said outer shroud to open to a radially outer face of said trailing hook portion of said inner shroud, and said resilient seal is seated in said groove.

9. A sealing arrangement for a stator shroud segment comprising: an outer shroud having a leading edge and a trailing edge, said outer shroud comprising a leading edge hook and a trailing edge hook, both said hooks of said outer shroud projecting in opposite axial directions; a plurality of inner shrouds each having a leading edge and a trailing edge, each of said inner shrouds comprising a leading edge hook and a trailing edge hook, both said hooks of said inner shroud projecting towards one another; said leading and trailing hooks of each said inner shroud being respectively engaged with said leading and trailing hooks of said outer shroud, said engagement connecting said inner shroud to said outer shroud; an impingement plate defining a post impingement cavity in said at least one inner shroud; and a resilient seal located between the respective trailing edge hook of each said inner shroud and said outer shroud, wherein a seal groove is defined in one of said inner and outer shrouds and opens radially to face the other of the inner and outer shrouds adjacent the trailing edge, said resilient seal being disposed in said seal groove, thereby to seal a trailing edge of said post impingement cavity defined in part by a radially outer surface of said inner shroud.

10. A sealing arrangement for a stator shroud segment as in claim 9, wherein said resilient seal is generally W-shaped.

11. A sealing arrangement for a stator shroud segment as in claim 9, wherein said resilient seal is a wave seal shaped generally as a Greek letter omega.

12. A sealing arrangement for a stator shroud segment as in claim 9, wherein said resilient seal is made from a nickel-based alloy designed to withstand temperatures in the range of 1200 to 1300° F.

13. A sealing arrangement for a stator shroud segment as in claim 9, wherein said leading and trailing edge hooks of said outer shroud define respective leading and trailing edge grooves for respectively receiving therein said leading and trailing edge hooks of said inner shrouds.

14. A sealing arrangement for a stator shroud segment as in claim 9, wherein said resilient seal is formed from a single piece of material.

15. A sealing arrangement for a stator shroud segment as in claim 9, wherein the seal groove is defined in said outer shroud to open in facing relation to a radially outer face of said trailing hook of inner shroud.

16. A method for sealing post impingement cavity in a stator shroud of a multi-stage gas turbine comprising at least one stator shroud segment having a leading edge and a trailing edge with respect to hot gas flow through said gas turbine, each shroud segment including an outer shroud and at least one inner shroud connected thereto; said outer shroud having first and second grooves defined adjacent to and along said leading and trailing edges; said at least one inner shroud having a leading edge axially projecting hook portion and a trailing edge axially projecting hook portion for respectively engaging said first and second grooves of said outer shroud, said engagement connecting said inner shroud to said outer shroud; and an impingement plate defining a post impingement cavity in said at least one inner shroud, said method comprising: providing a resilient seal between said trailing edge axially projecting hook portion of said at least one inner shroud and said outer shroud, thereby to seal a trailing edge of said post impingement cavity defined in part by a radially outer surface of said inner shroud, wherein said resilient seal is disposed in a seal groove defined in one of said inner and outer shrouds and radially facing the other of said inner and outer shrouds adjacent said trailing edge.

17. A method as in claim 16, wherein said step of providing a resilient seal comprises disposing a resilient seal that is one of generally W-shaped and generally wave seal shaped as a Greek letter omega.

* * * * *

UNITED STATES PATENT AND TRADEMARK OFFICE
CERTIFICATE OF CORRECTION

PATENT NO.        : 7,338,253 B2                                              Page 1 of 1
APPLICATION NO. : 11/226393
DATED             : March 4, 2008
INVENTOR(S)       : Nigmatulin It is certified that error appears in the above-identified patent and that said Letters Patent is hereby corrected as shown below:

At column 4 line 41 delete the numeral "124" and insert the numeral --224--

Signed and Sealed this

Eleventh Day of November, 2008

JON W. DUDAS
*Director of the United States Patent and Trademark Office*